P. C. FRITZ.
Seed Separator.

No. 22,359.

Patented Dec. 21, 1858.

UNITED STATES PATENT OFFICE.

P. C. FRITZ, OF BARRYTOWN, NEW YORK.

MACHINE FOR SEPARATING GARLIC FROM GRAIN.

Specification of Letters Patent No. 22,359, dated December 21, 1858.

*To all whom it may concern:*

Be it known that I, PHILIP C. FRITZ, of Barrytown, in the county of Dutchess and State of New York, have invented a new and useful Machine for Separating Garlic from Wheat and other Grain; and I do hereby declare that the following is a full, clear, and exact description of the same, reference being had to the annexed drawings, making a part of this specification, in which—

Figure 1:
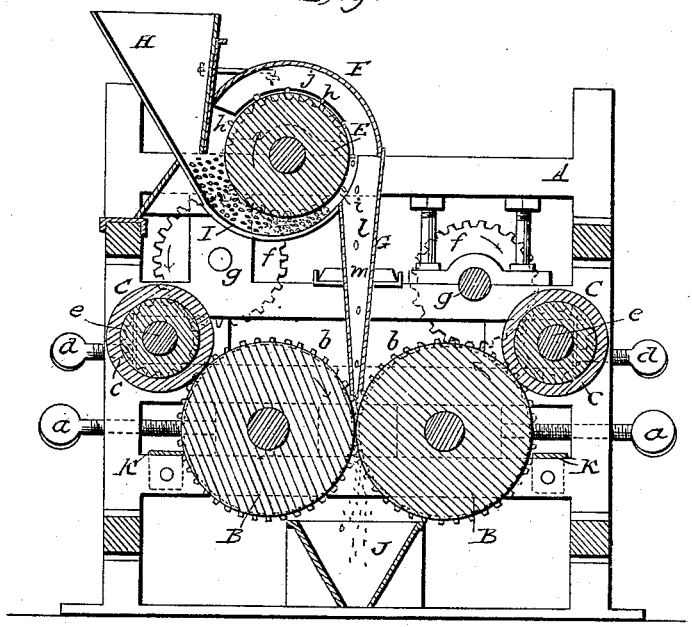
Figure 2:
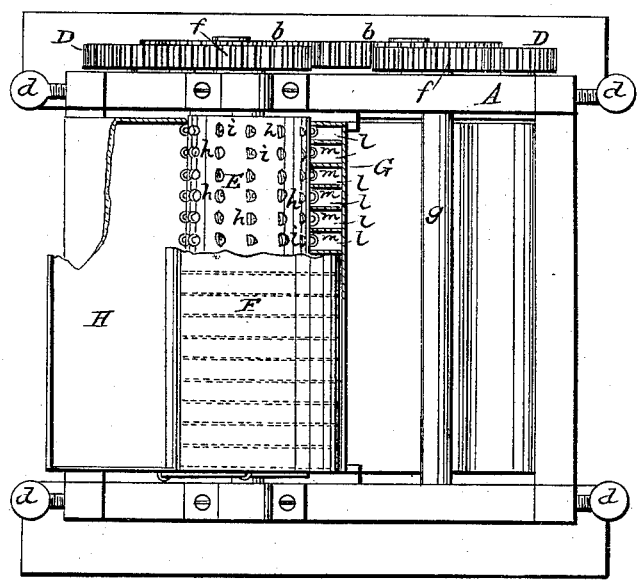

Figure 1, is a side sectional elevation of my invention, the plane of section passing through the center. Fig. 2, is a plan or top view of ditto, a portion of the hopper and cylinder case being broken away.

Similar letters of reference indicate corresponding parts in the two figures.

This invention consists in passing the grain, from which the garlic is to be separated, between rollers in such a manner that the garlic seed will be kept separate from the grain and both crushed by the rollers when the former are not in contact with each other, the grain as soon as crushed falling immediately down between the rollers, while the garlic seed owing to the moisture or juice they contain adhere to the rollers and are scraped therefrom, the separation being due to the adhesive tendency of the crushed garlic seed.

To enable those skilled in the art to fully understand and construct my invention I will proceed to describe it.

A, represents a rectangular framing which may be constructed in any proper manner to support the working parts, and B, B, are two rollers which are placed in the lower part of the framing, the journals of said rollers being fitted in bearings which may be regulated by set screws $a$, so as to adjust to a certain extent the rollers nearer to or farther from each other as may be desired. The journals of the rollers B, B, at one end have toothed wheels $b$, $b$, attached, said wheels gearing into each other and having teeth sufficiently long to remain in gear and still admit of a requisite degree of adjustment of the rollers B, B, by the screws $a$. The rollers B, B, may be of metal turned perfectly smooth.

C, C, are two rollers which are placed in contact, one with each roller B, the rollers C, C, being covered with cloth $c$, or any suitable material which is in contact with the rollers B, B, and made to bear against them with a requisite degree of pressure by means of screws $d$, which actuate the bearings of said rollers. The rollers C, C, may be of wood fitted on metal shafts $e$, $e$, each of which have at one end a toothed wheel D, attached said wheels gearing into wheels $f$, $f$, which are at one end of the shafts $g$, $g$, the wheels $f$, $f$, gearing into the wheels $b$, $b$, of the rollers B, B.

E, is a cylinder which is placed on the upper part of the framing A, and parallel with the rollers B, B, C, C. The cylinder E, may be of wood and provided with radial teeth or projections $h$, which extend around the cylinder E circumferentially in rows at equal distances apart the projections being at equal and suitable distances apart in the rows in the periphery of the cylinder and directly in front of each projection a cavity $i$, is formed as shown in Fig. 2. The upper part of the cylinder E, is covered with a sheet metal case F, to the inner side of which partition plates $j$, are attached, said plates extending down nearly to the cylinder E, so as to form compartments or passages for the several rows of teeth. This will be clearly understood by referring to Fig. 2. The outer ends of the passages formed by the plates $j$, communicate with passages $l$, which are formed by partition plates $m$, placed within a vertical narrow box G, which is directly over the space between the two rollers B, B, the lower end of box G, being within a short distance of the "bite" of the rollers. The case F, as well as the box G, may be of sheet metal.

H, is a hopper which is placed on the upper part of the framing A. The bottom of this hopper communicates with a curved chamber I, which is below the cylinder E, as shown clearly in Fig. 1. The hopper and chamber may be formed either of wood or sheet metal.

In the lower part of the frame A, and at the outer side of each roller B, B, a scraper K, is placed. These scrapers are metal plates having their inner edges beveled and touching the peripheries of the rollers as shown in Fig. 1.

The operation is as follows:—The grain from which the garlic is to be separated is placed in the hopper H, and passes down into the chamber I, below the cylinder E. Power is applied to either of the shafts $g$, and the cylinder E, and rollers B, B, C, C, rotate in the direction indicated by the red arrows placed on them as shown in Fig. 1.

The projections $h$, of cylinder E, as said cylinder rotates take each up a kernel of grain or a seed of garlic from the chamber I, the kernels of grain and the garlic seed being carried around through the chambers of the case F, and deposited into the upper ends of the passages $l$. The projections $h$, it will be understood can only take one kernel of grain or one garlic seed each, and consequently as the cylinder E, rotates the kernels of grain and garlic seed will fall through the compartments $l$, of the box G, a certain distance apart corresponding to the distance between the projections $h$, for the kernels of grain and garlic seed are of equal specific gravity and also equal in size: the larger garlic seed and also all lighter ones of equal size with the kernels of grain being previously separated from the grain by any of the usual grain separating devices. The kernels of grain and garlic seed are conducted by the passages $l$, between the two rollers B, B, and both crushed thereby, but, it will be seen that owing to the space between the kernels of grain and the garlic seed they will be crushed separately, that is to say, a kernel of grain and a seed of garlic will not be crushed together and simultaneously in the same place on the rollers, they must necessarily be crushed separately on account of dropping between the rollers at a suitable distance apart. The kernels of grain as soon as crushed by the rollers drop immediately into a receptacle J, prepared to receive them, but the garlic seed when crushed will adhere to the rollers B B, in consequence of the moisture or juice they contain. The crushed garlic seed are scraped from the rollers B, B, by the scrapers K, K, and the rollers B, B, are wiped perfectly clean by the coverings $c$, of the rollers C, C, it being essential that the rollers B, B, be kept perfectly clean on account of the strong odor the juice of the garlic seed possesses. In Fig. 1, the kernels of grain are shown in red, and the garlic seeds are shown in black.

This machine has been practically tested and it operates well. It will prove highly valuable, for large quantities of grain annually have been hitherto rendered almost worthless for grinding into flour for edible purposes on account of the garlic contained in it.

I do not confine myself to the precise arrangement of parts herein shown and described for the purpose specified for they may be modified in various ways; but,

Having thus described my invention, what I claim as new and desire to secure by Letters Patent, is,

Separating garlic from grain by passing the same between crushing rollers in the manner substantially as shown and described that the garlic seed and kernels of grain will be crushed separately between the rollers and the crushed grain allowed to descend into a proper receptacle while the garlic seed on account of the moisture or juice they contain adhere to the rollers and are scraped therefrom.

P. C. FRITZ.

Witnesses:
 WM. FUSCHL,
 W. HAUFF.